United States Patent [19]
Koebel, Jr.

[11] 3,815,875
[45] June 11, 1974

[54] PORTABLE STAKE REMOVER

[75] Inventor: Alan D. Koebel, Jr., Southfield, Mich.

[73] Assignee: James L. Hulet, Roseville, Mich.

[22] Filed: Oct. 24, 1972

[21] Appl. No.: 300,217

[52] U.S. Cl. ............................................. 254/132
[51] Int. Cl. .............................................. B66f 3/00
[58] Field of Search ............................... 254/29–31, 254/120, 129–132

[56] References Cited
UNITED STATES PATENTS

| | | | |
|---|---|---|---|
| 59,421 | 11/1866 | Lewis | 254/120 |
| 199,904 | 2/1878 | Green | 254/120 X |
| 931,387 | 8/1909 | Conde | 254/131 S |
| 1,027,867 | 5/1912 | Ludlum | 254/130 |
| 2,226,456 | 12/1940 | Westendorf | 254/132 |
| 2,424,929 | 7/1947 | Haney | 254/132 |
| 2,661,186 | 12/1953 | Helin | 254/131 S |
| 2,777,726 | 1/1957 | Lundgren et al. | 254/131 |

Primary Examiner—Othell M. Simpson
Attorney, Agent, or Firm—Charles W. Chandler

[57] ABSTRACT

A portable stake remover having an elongated arm pivotally mounted on a base that is positioned adjacent the stake. A jaw having a generally triangularly shaped opening for receiving the stake is carried on the arm. As one end of the arm is swung downwardly in a vertical motion, the jaw carried on the opposite end of the arm, pulls the stake from the ground.

1 Claim, 4 Drawing Figures

PATENTED JUN 11 1974  3,815,875

PORTABLE STAKE REMOVER

BACKGROUND OF THE INVENTION

This invention relates to implements for pulling stakes from the ground.

Stake removers are used for removing fence posts, sign posts, stakes and the like from the ground. Such devices usually include an arm pivotally mounted on a support that functions as a fulcrum. Means are carried on one end of the arm to form a connection with the stake such that the opposite end of the arm can be lowered to raise the stake from the ground. A problem with such prior art devices is that they often employ a complicated jaw device for engaging the stake in a secure connection.

SUMMARY OF THE INVENTION

The broad purpose of the present invention is to provide a stake remover having a one-piece jaw that can be easily and quickly connected to stakes having a round, square or angular cross-section. In the preferred embodiment of the invention, which will be described in greater detail, the jaw has a body and a pair of fingers forming a generally triangularly shaped opening. As the jaw is pivoted to raise the stake, it is engaged in three circumferentially spaced positions by the jaw in a tight fitting connection. One of the two jaw fingers is preferably supported parallel to the ground to provide a hook that is useful under appropriate circumstances.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
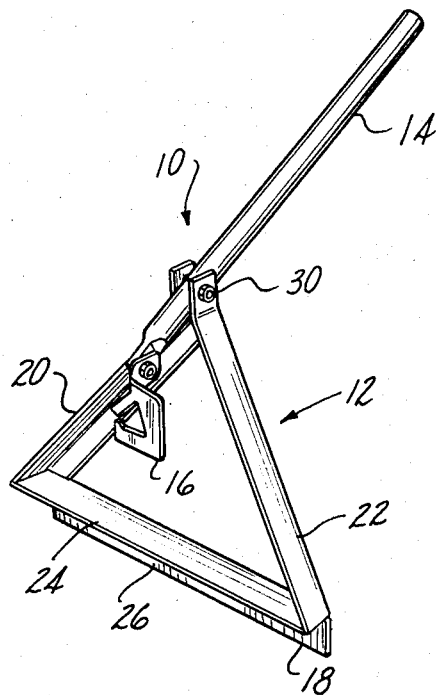
FIG. 1 is a perspective view of a stake remover illustrating the preferred embodiment of my invention.

A preferred stake remover 10, illustrated in FIG. 1, comprises a base 12, an arm 14 and a jaw 16.

Figure 2:
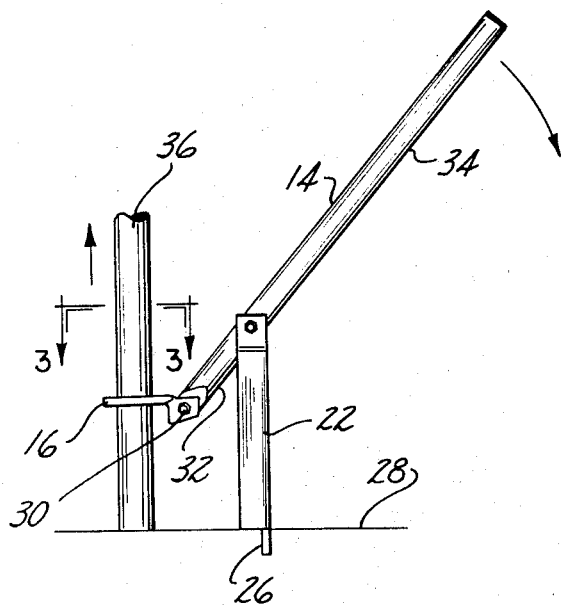
FIG. 2 shows the preferred stake remover in position for removing a stake.

Base 12 is formed of a metal angle with a bottom 18, and a pair of legs 20 and 22 having their lower ends connected to opposite ends of bottom 18. As best illustrated in FIG. 2, bottom 18 has sides 24 and 26 at right angles to one another such that side 26 can be received in ground 28 with side 26 being disposed parallel to the ground. Side 26 thereby prevents the base from sliding across the surface of the ground as a stake is being pulled from the ground.

A pivot member 30 connects the upper ends of legs 20 and 22 to arm 14 adjacent a short end 32 of the arm. The opposite, long end of the arm, hereafter referred to as handle 34, can be swung down in a motion which raises short end 32 upwardly. The length of handle 34 is several times the length of short end 32 so as to function as a lever for removing a stake 36 from the ground.

Figure 3:
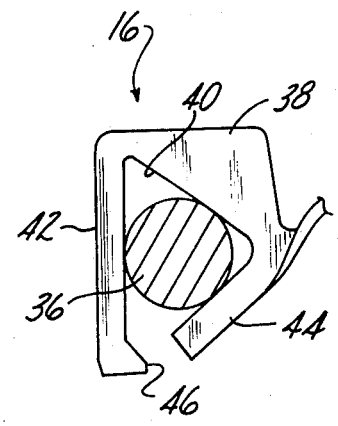
FIG. 3 is an enlarged sectional view taken along lines 3—3 of FIG. 2.

Referring to FIG. 3, metal jaw 16 is pivotally connected to the extreme end of short end 32. Jaw 16 has a body 38 with a linear stake-engaging section 40. A pair of fingers 42 and 44 are connected to opposite ends of stake-engaging portion 40 to form a generally triangularly shaped opening. The free end of finger 32 has a shoulder 46 adjacent the opening between the two fingers. It is to be noted that finger 42 is supported transversely to arm 14 which allows the finger to be used as a hook for pulling objects from the ground.

In operation, base 22 is mounted on the ground adjacent stake 36 with bottom side 26 pressed into the ground 28. Preferably the base is spaced from the stake to permit handle 34 to be disposed at an angle of about 45° with respect to the ground, and jaw 16 to be arranged in a horizontal position about the stake.

As shown in FIG. 3, the jaw engages the stake in three positions. The shape of the jaw opening accommodates stakes of different diameters. The user then swings the outer end of handle 34 downwardly to raise the jaw and thereby pull the stake from the ground. If the upward motion of the jaw is insufficient to totally remove the stake from the ground, the user can reposition the jaw on the stake by raising the handle and repeating the downward motion.

Figure 4:
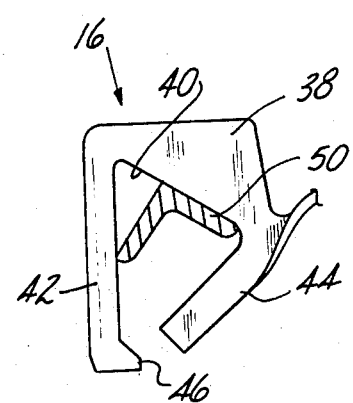
FIG. 4 shows the preferred jaw disposed for removing a stake having a right-angle cross-section.

FIG. 4 illustrates a stake 50 having a right angle cross-section, received in the jaw opening. Such a stake can be passed through the opening between the ends of fingers 42 and 44 into the triangular opening.

It is to be noted that the preferred stake remover is composed of a relatively few components and can be quickly and easily operated.

Having described my invention, I claim:

1. A portable remover for removing a stake from the ground comprising:

a support having three legs, including a ground-engaging bottom leg, and a pair of side legs having lower ends connected to opposite ends of the bottom leg, the bottom leg having a pair of elongated flat sides having a substantially common width and connected along their longitudinal edges at right angles to one another such that one side is received into the ground when the other side is disposed parallel to the ground and in contact therewith;

an elongated arm and means pivotally connecting the arm to the upper ends of the support side legs such that the ends of the arm on one side of the support forms a handle having several times the length of the opposite, short end of the arm;

a jaw having a planar section with a generally triangularly shaped jaw opening having three linear sides including a base, a second side having one end connected to the base, and a short side connected to the opposite end of the second side, the jaw including a shoulder integrally carried on the end of the base, opposed and spaced with respect to the short side; and means pivotally mounting the jaw on the short end of the arm such that the base of the jaw opening is disposed parallel to the bottom leg of the support, and the vertex formed by the second side and the short side of the jaw opening is disposed between the pivotal mounting means and the base whereby the shoulder and the short side of the jaw opening form a lateral opening for receiving a stake into the jaw opening, and the shoulder is operative to prevent accidental removal of the stake through said lateral opening.

* * * * *